United States Patent [19]
Cohen et al.

[11] 3,726,027
[45] Apr. 10, 1973

[54] TEACHING AID AND EDUCATIONAL TOY

[76] Inventors: Lael I. Cohen, 6720 Dwight Way, San Bernardino, Calif. 92404; William F. Elko, 133 North University Avenue, Apt. 35, Redlands, Calif. 92373; Gerald Cohen, 6720 Dwight Way, San Bernardino, Calif. 92404

[22] Filed: Jan. 21, 1971

[21] Appl. No.: 108,339

[52] U.S. Cl. ..............................35/72, 35/73, 46/24
[51] Int. Cl. ...................................................A63h 33/04
[58] Field of Search.................35/69, 72, 73, 22 A; 46/24, 174

[56] References Cited

UNITED STATES PATENTS

| | | | |
|---|---|---|---|
| 810,613 | 1/1906 | Burke et al. | 46/174 |
| 1,292,188 | 4/1969 | Wheeler | 35/72 X |
| 1,314,541 | 9/1919 | Seeger | 46/24 X |
| 1,922,229 | 8/1933 | Burke | 35/69 X |
| 2,103,739 | 12/1937 | Whelan | 46/174 X |
| 3,235,263 | 2/1966 | Smith | 35/22 A X |
| 3,271,895 | 9/1966 | Sorensen | 35/72 X |
| 3,484,105 | 12/1969 | Winston | 35/72 X |
| 3,510,964 | 5/1970 | Dahners | 35/22 A |
| 3,608,906 | 9/1971 | Odier | 35/72 X |

FOREIGN PATENTS OR APPLICATIONS 491,926   9/1938   Great Britain..........................35/28

OTHER PUBLICATIONS

"Texture Ball" Page 4 of Creative Playthings Catalog Rec'd September 1966
"Mirror Box" Page 2 of Creative Playthings Catalog Rec'd September 1965

*Primary Examiner*—Harland S. Skogquist
*Attorney*—Christie, Parker & Hale

[57] ABSTRACT

A teaching aid and educational toy includes a hollow box preferably shaped as a cuboctahedron having its outer faces covered with sheets of fabric in various colors. In one form of the invention, a plurality of illustration objects, such as cutouts of numerals or letters of the alphabet, are made of or backed with a material which adheres to the fabric covering the outer faces of the box to permit a student to attach the objects to specific faces of the box when learning to associate the objects with certain of the colors appearing on the box. In another form of the invention, at least one face of the box is open, and the inner faces of the box are covered with materials of different textures so a student may reach through the opening and touch a given inner face when learning to form word associations with the various textures.

13 Claims, 4 Drawing Figures

3,726,027

TEACHING AID AND EDUCATIONAL TOY

BACKGROUND OF THE INVENTION

This invention relates to educational game devices, and more particularly to a hollow box with a plurality of outer faces of various shapes displaying different colors for use in teaching children word associations and the like.

In the past, models of the various polyhedra (solids formed by plane faces) have been used to illustrate elementary mathematical concepts to students studying plane and solid geometry. However, models of polyhedra generally are not used to illustrate various interrelated concepts and word associations to beginning grade school students.

SUMMARY OF THE INVENTION

Briefly, this invention provides a teaching aid and educational toy comprising an object with a hollow interior, and shaped as a polyhedron. In one form of the invention, at least one of the faces of the object has an opening through it to permit a student to extend his hand inside the object. Material of various textures cover the inner faces of the object, with the textures corresponding to certain of the colors of the outer faces. The object may be used to illustrate to students a variety of concepts, such as different textures and geometric shapes. The outer faces of the object may be in various colors, in which case the student may touch a selected one of the inner faces and form a word association with the texture of the material covering the selected face and associate the texture with the color on the reverse side of the selected face. The object also may be used to illustrate other concepts such as spatial relationships, and the like.

In another form of the invention, the outer faces of the object are covered with material in various colors. A plurality of illustration objects are made of a material that adheres to the material covering outer faces of the object. The illustration objects have colors corresponding to the colors of the outer faces, and in use a student may select a given illustration object and attach it to a corresponding outer face of the object. Thus, illustration objects shaped as letters of the alphabet may be attached to specific outer faces to permit a student to form an association between a particular letter and a corresponding color.

Preferably, the object is shaped as a cuboctahedron which is a 14-sided polyhedron having eight triangular faces and six square faces. This shape is useful because it has a large number of faces for illustrating materials of various textures, and displaying a variety of different colors, such as the primary and secondary colors, achromatic colors, and combinations thereof.

DETAILED DESCRIPTION OF THE PREFERRED EMBODIMENT

Figure 1:
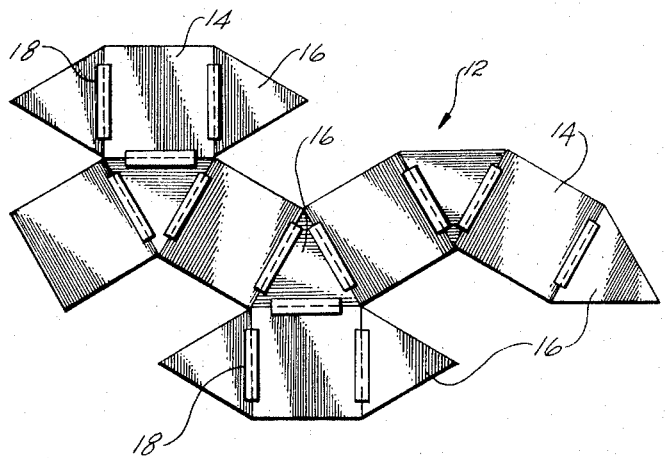
FIG. 1 shows the flat-form pattern of a cuboctahedron.
Figure 2:
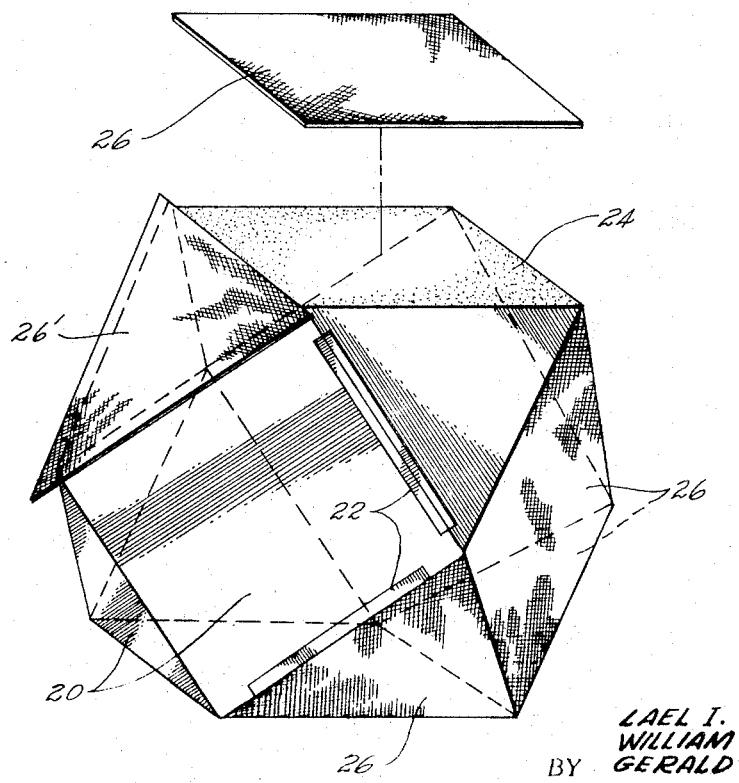
FIG. 2 is an isometric view of a cuboctahedron being assembled from the pattern of FIG. 1.

Referring to the drawings, a teaching aid and educational toy comprises a box 10 shaped as a cuboctahedron. FIGS. 1 and 2 show a preferred method of constructing box 10. The box is assembled from a flat-form pattern or "net" 12 having six square faces 14 and eight faces 16 shaped as equilateral triangles. Individual faces 14 and 16 preferably are separate pieces made of cardboard, although other materials, such as plastic or wood veneer panels may be used.

The separate faces are arranged in pattern 12, with all adjacent edges of faces 14 and 16 being fastened together by separate pieces 18 of adhesive tape. Separate sheets of adhesive backed contact paper 20 (see FIG. 2) are secured to the taped sides of the faces 14 and 16 and trimmed around the edges so they match the size and shape of their respective faces.

The pattern is then turned over, and pieces of tape (not shown) and contact paper (not shown) are similarly applied to the reverse sides of faces 14 and 16.

Figure 3:
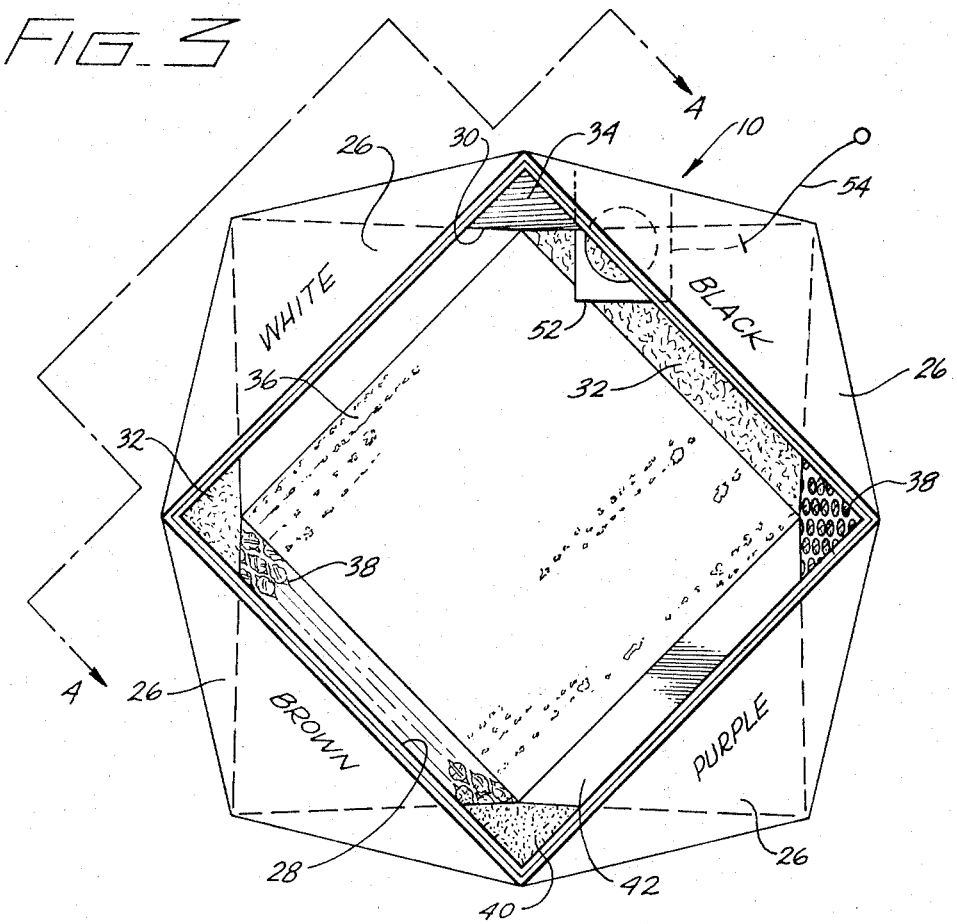
FIG. 3 is a perspective view of the cuboctahedron in its assembled form.
Figure 4:
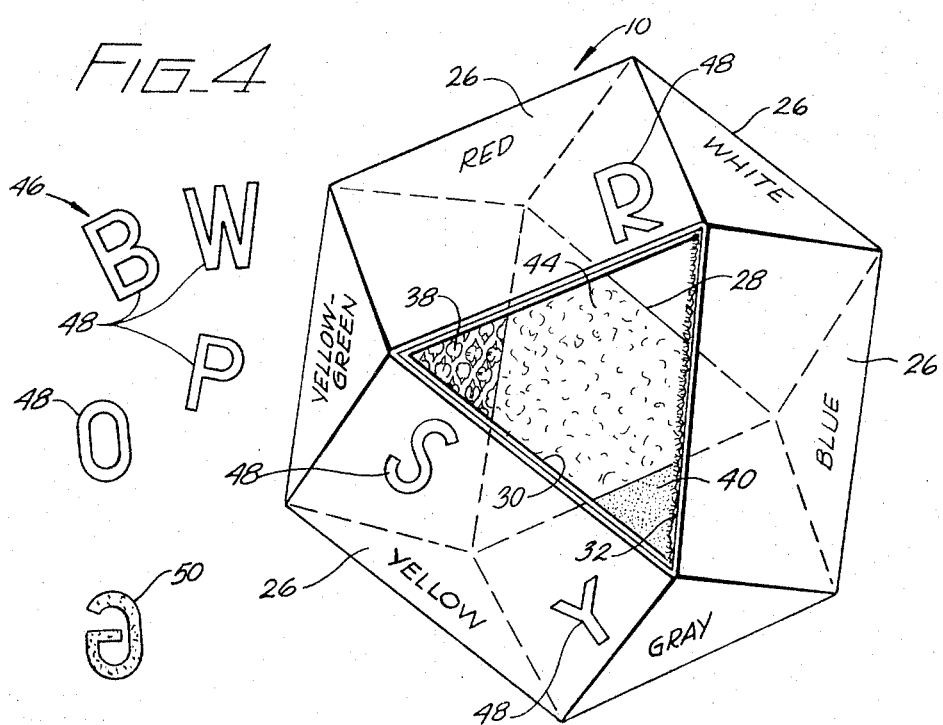
FIG. 4 is a perspective view taken on line 4—4 of FIG. 3 showing the cuboctahedron and illustration objects attached thereto.

The edges of the faces which span the perimeter of the pattern 12 are then fastened together by separate pieces 22 of adhesive tape (see FIG. 2) to form a rigid cuboctahedron 10, as shown in FIGS. 2, 3, and 4.

Alternatively, pattern 12 may be cut intact from a large piece of cardboard or similar material. The boundary between each pair of adjacent faces may be scored or "crushed" so the individual faces may be folded together to form a unified frame in the shape of a cuboctahedron. Strips of adhesive tape are used to connect only the outer edges of the net. This form of cuboctahedron has greater strength than the one made of individual faces secured together.

As a further alternative, box 10 may be a single piece object made of injection molded plastic material.

As shown best in FIG. 2, a layer 24 of adhesive material, such as rubber cement, is applied to the outer contact paper surface of each outer face of the rigid cuboctahedron model, one face at a time. A separate sheet 26 out of soft pile material, such as flannel, felt, or thistle-cloth pile material is applied to each layer of adhesive so each outer face of the cuboctahedron is covered with a respective piece of pile material. Sheets 26 are preferably cut oversized (such as is shown at sheet 26' in FIG. 2) and trimmed around the edges after the sheet is applied to the adhesive layer.

Sheets 26 covering the outer faces of box 10 are in different colors. Thus, the cuboctahedron may be used as an instructional aid in teaching colors and color associations to young children. Preferably, each outer face is covered with a different monochromatic sheet. Alternately, the sheets may be in different colored designs or the like so long as each design is such that it may be used to teach children colors, patterns, or similar concepts.

The faces of box 10 are of a size which is sufficiently large that each colored surface may be clearly visible from various parts of a typical classroom. At the same time the size of the box is compromised so it is not too large or bulky for small children to hold by themselves. The preferred size of the square and triangular faces is eight inches on a side, which is a good compromise between sufficiently large outer faces and an appropriate overall size and weight of the cuboctahedron.

The cuboctahedron is a preferred shape for the box 10 because its faces display a large number of different colors or patterns. All square faces of the cuboctahedron are the same size and all triangular faces are the same size. Thus, a cuboctahedron with faces of the preferred size, say 6 to 8 inches on a side, has each face clearly visible from anywhere within the ordinary classroom. Moreover, the shape of the cuboctahedron is roughly spherical, or ball-shaped, which is convenient for small children to hold.

When a closed cuboctahedron is formed, the six square faces preferably display four of the "psychological primary colors," red, yellow, blue, and green, and two of the secondary colors, orange, and purple. The eight triangular faces preferably display achromatic colors such as black, white, and gray, and secondary combinations of the four primaries, such as yellow-green, blue-green, and brown, and other color combinations such as beige, and pink. Other arrangements of colors may be made, however, and colors may be presented in the form of patterns or psychadelics, if desired.

When one or more openings are provided in the cuboctahedron, the colors may be rearranged as desired, although it is preferred to always display the above-described primary, secondary, and achromatic colors because they are the foundation of a child's working knowledge of colors.

It is preferred to use the specific arrangement of colors described above on different cuboctahedron teaching aids for uniformity to aid the child's understanding of colors.

As shown best in FIG. 4, the three primary colors are displayed on one side of box 10 so they may be visible simultaneously. This arrangement of colors is preferred because the primary colors may be taught while holding the box in a single position.

The box shown in FIGS. 3 and 4 has a square face removed to provide a square opening 28. A triangular face on the side substantially opposite opening 28 is removed to provide a triangular opening 30. The openings expose the inner faces of the cuboctahedron which are covered with materials of various textures. The inner faces may be covered with any suitable materials capable of teaching a child a variety of textures. Openings 28 and 30 permit a child to insert his hands inside box 10 to touch the various materials covering the inner faces so he may form word associations with the texture of a material he is able to feel with his hands.

Preferably, box 10 has the following materials covering both a triangular and a square inner face: a furry rug 32, a piece of ribbed plastic 34, a relatively rough vinyl tile 36, a piece of sponge rubber 38, and a sheet of sandpaper 40. Each square piece of material and its corresponding triangular piece preferably are arranged on faces roughly opposite one another. A piece of smooth contact paper 42 covers a triangular inner face, and a sheet of felt or thistle-cloth pile material 44 covers the remaining triangular inner face.

In use, box 10 shown in FIGS. 3 and 4 may be used to teach students word associations with the textures of the various materials covering its inner faces. For example, the materials may be used to illustrate such concepts as smooth; ribbed, bumpy or corrugated; furry; resilient, springy, or pliable; rough or abrasive, and so forth. The box also may be used as a means of teaching word associations, such as associating the color of a particular outer face with a particular textured covering of its inner face. Thus, a child may be instructed to hold an outer face of a given color in a given position, and then to feel and describe the inner face corresponding to the selected color to form a word association between the color and the given texture.

It may be desirable to teach children textures other than those present inside the box. In this case, sheets (not shown) of textured material having their reverse sides covered with thistle cloth hook material may be inserted in the box, fastened to pile material 44, and removed therefrom when desired. Alternatively, a square inner face of the box may be covered with pile material, and square illustration pieces of various textures may be used. Preferably, the pile material covers an inner face close to one of the openings in the box so the child can easily insert his arms into the box to identify, feel, and describe the texture of the new surface. Thus, numerous textures and other illustration objects can be removably fastened inside the box and used for teaching purposes.

Box 10 also is useful in teaching children elementary spatial concepts. The faces of the cuboctahedron represent basic geometric shapes, i.e., the square and triangle. Other polyhedra may be used in place of the cuboctahedron to illustrate other geometric shapes such as the rectangle, circle, pentagon, trapezoid, parallelogram, and so forth. Moreover, the open form of the cuboctahedron may be used as an instructional aid in illustrating directional concepts, such as inside, outside, right, left, forward, rear, and so forth, by having the student reach through a particular opening and touch a particular inner face of the cuboctahedron.

FIG. 4 illustrates a further application of the box 10 in illustrating word associations. A plurality of illustration objects 46 made of materials such as felt, paper, or plastic have front faces 48 which are cut out in shapes or patterns which may represent various concepts to be instructed. The illustration objects shown in FIG. 4 are cut in the shape of letters of the alphabet, although other shapes may be used, such as numerals, shapes of objects, geometric shapes, and so forth. The reverse sides of the illustration objects may be covered with a pile material such as felt. Thus, the illustration objects may be placed on the pile material covering the outer faces of the box so they cling to the outer faces. It is preferred to apply thistle-cloth hook material 50 to the reverse sides of the illustration objects to they may be firmly attached to the pile material covering the outer faces of the box. However, the outer faces of the object may be plastic, metal, or other material, and the illustration objects may have at least one side capable of adhering to the outer faces.

In use, a student is taught to associate a given illustration object with a certain outer face of the cuboctahedron and then attach the object to the correct outer face. For example, the letters R and Y are fastened to the red and yellow faces, respectively, of the cuboctahedron. As a further example, the letter S may be fastened to any of the square faces of the cuboctahedron.

The box 10 may be constructed from flat-form by students to instruct them how to read and follow directions. The open form of the cuboctahedron also may be used as a container when not in use as an instructional aid. For example, the box may contain a recorded sound mechanism 52 attached to an inner face. When operated from the exterior, it may give directions, play music, present information, or transmit other sounds. With this concept, the sound device may be actuated by pulling a drawstring 54, for example, to tell the child to perform some specific function or the like.

I claim:

1. A teaching aid and educational toy comprising an object having a hollow interior and being shaped as a polyhedron with outer faces, material in various colors covering the outer faces of the object, such that the faces of the object display at least the six primary and secondary colors, and a plurality of illustration objects capable of adhering to the material on the outer faces of the object, the illustration objects having colors which correspond to the colors of the outer faces, whereby one of the illustration objects may be selected and attached to a corresponding outer face of the object.

2. Apparatus according to claim 1 wherein the object is shaped as a cuboctahedron.

3. Apparatus according to claim 1 wherein a textured material covers the outer faces of the object, and a textured material capable of adhering to the material on the object covers one side of each of the illustration objects.

4. Apparatus according to claim 1 wherein the object is shaped so the angle between any given outer face of the polyhedron and any of its adjacent faces is at least 90°.

5. Apparatus according to claim 1 wherein the object is shaped to include at least some triangular and rectangular outer faces.

6. Apparatus according to claim 1 wherein the object is shaped so at least four outer faces are visible when the object is viewed from any direction.

7. A teaching aid and educational toy comprising an object with a hollow interior, the object being shaped as a polyhedron having outer faces in a plurality of geometric shapes, the outer faces being in a variety of colors; an opening through at least one of the outer faces to facilitate placing a student's hand inside the object so the student may reach the inner faces of the object; and material having a variety of surface irregularities covering the inner faces of the object, whereby the student may touch a selected one of the inner faces and associate the texture of the selected inner face with the color or shape of the outer face corresponding to the selected inner face.

8. Apparatus according to claim 7 wherein the object is shaped as a cuboctahedron.

9. Apparatus according to claim 7 wherein the object is shaped so the angle between any given outer face of the polyhedron and any of its adjacent faces is at least 90°.

10. Apparatus according to claim 7 wherein the object is shaped so at least four outer faces are visible when the object is viewed from any direction.

11. Apparatus according to claim 7 wherein the object has a sufficient number of outer faces to display thereon the six primary and secondary colors and certain achromatic colors.

12. Apparatus according to claim 11 including a plurality of illustration objects each in the form of a sheet having a textured outer surface and a reverse surface adapted to adhere to at least one of the inner faces of the object, whereby the illustration objects may be removably attached to said inner face.

13. A teaching aid and educational toy comprising an object having a hollow interior and being shaped as a polyhedron with outer faces, the polyhedron being shaped so at least four outer faces are visible when the object is viewed from any direction, material in various colors covering the outer faces of the object, and a plurality of illustration objects capable of adhering to the material on the outer faces of the object, the illustration objects having colors which correspond to the colors on the outer faces, whereby one of the illustration objects may be selected and attached to a corresponding outer face.

* * * * *